June 30, 1964

C. E. ADAMS ETAL 3,139,105

HYDRAULIC PRESSURE COMPENSATOR

Filed June 22, 1962

*INVENTORS.*
*CECIL E. ADAMS*
*WENDELL E. RENICK*
BY
*WOOD, HERRON & EVANS*

INVENTORS.
CECIL E. ADAMS
WENDELL E. RENICK
BY
WOOD, HERRON & EVANS

June 30, 1964 C. E. ADAMS ETAL 3,139,105
HYDRAULIC PRESSURE COMPENSATOR
Filed June 22, 1962 4 Sheets-Sheet 4

INVENTORS.
CECIL E. ADAMS
WENDELL E. RENICK
BY
WOOD, HERRON & EVANS

United States Patent Office

3,139,105
Patented June 30, 1964

3,139,105
HYDRAULIC PRESSURE COMPENSATOR
Cecil E. Adams and Wendell E. Renick, Columbus, Ohio, assignors to American Brake Shoe Company, New York, N.Y., a corporation of Delaware
Filed June 22, 1962, Ser. No. 204,583
16 Claims. (Cl. 137—102)

This invention relates to a pressure compensating device for use in a hydraulic system.

Pressure compensators are employed to regulate the volume of hydraulic fluid supplied through a variable volume fluid pressure energy translating device so that the volume of flow will be just sufficient to maintain a desired fluid pressure. In response to an incipient change in the pressure which the compensator has been set to maintain, such as might be caused by a variation in the back pressure of the fluid being controlled, a pressure compensator regulates or adjusts the volume of flow through the fluid pressure energy translating device, increasing or decreasing the flow by an amount sufficient to restore the pressure to the desired value so long as the factors which tended to cause the pressure change exist.

A typical application of a pressure compensator is in controlling the volume of fluid under pressure which is delivered by a variable volume fluid pump of the type having a hydraulic pressure operated volume of flow changing mechanism, so that the pump will be continuously regulated to supply only the volume of fluid which is necessary to maintain the pressure of the fluid delivered by the pump at a pre-established value, whereby if the pump outlet pressure tends to decrease, the pump will be regulated by the compensator to supply a greater volume of fluid, thereby restoring the outlet pressure to its proper value, and whereby if the pressure tends to increase from the desired value, the volume changing mechanism of the pump will be controlled by the compensator to deliver a smaller volume of fluid flow.

The variable volume fluid pressure energy translating devices with which pressure compensators are used have hydraulically operated volume changing mechanisms. In the case of an axial piston pump, the volume changing mechanism may include a cam plate which is swingable about an axis transverse to the axis of rotation of the piston barrel of the pump, the volume of flow delivered by the pump varying with the angulation of the cam plate, and a spring balanced hydraulically operated fluid motor or ram connected to the cam plate for controlling its angulation in accordance with the pressure of fluid supplied to the ram. In any event, when used to control the pressure delivered by a pump, the compensator responds and compensates for incipient changes in pressure by changing the pressure of the fluid applied to the pump volume changing mechanism in such manner as to cause the volume to be changed in a direction restoring, or tending to restore, normal pump output pressure conditions. Specifically, incipient changes in the pressure to be maintained are sensed by the compensator and are reflected in the pressure supplied to the hydraulically actuated volume changing mechanism of the translating device in such manner that the volume of fluid passing through the translating device is changed to restore normal pressure.

In the past, conventional pressure compensators have included an adjustable sequence valve for maintaining a desired pressure in a fluid passage such as the discharge line of a fluid pump. The outlet of the sequence valve has been connected through a flow restricting valve to the volume changing mechanism of the translating device, so that fluid flow through the sequence valve will be supplied at a restricted rate to the volume changing mechanism to change the volume of flow delivered by the device being controlled in a more or less gradual manner and to prevent a large volume of fluid under pressure from being abruptly applied to the volume changing mechanism, which might be damaged. A relief valve has been used to spill excess fluid delivered through the sequence valve, as when a sudden stoppage of flow occurs in the line in which pressure is being controlled. A bleed off valve has been connected directly to the volume changing mechanism to drain off pressure applied to that mechanism when the sequence valve is closed, to permit the mechanism to increase the volume of flow delivered when the pressure being regulated drops from the proper value. The rate at which the flow volume could be changed in response to an incipient change in pressure has in past compensators been dependent upon the rate at which the relatively large quantity of fluid acting on the volume changing mechanism could be drained through the bleed off valve, and the rate of volume increase and decrease have necessarily been about equal.

We have invented an improved pressure compensator which provides better control over the operation of the volume changing mechanism of the translating device with which the compensator is used. Pressure compensators in accordance with this invention permit independent adjustment of the rate of volume of flow increase and decrease, so that each rate can be precisely and independently set for most efficient operation of the specific type of pump or motor with which the compensator is used. Moreover, provision is made whereby the speed of volume increase may be adjusted to be very rapid if desired, yet the compensator will maintain a desired pressure with very little flow through it. In past compensators, by way of contrast, the rates of speed of both volume of flow increase and decrease were necessarily about equal, as previously mentioned, and moreover the volume of flow passing through the translating device could not be increased as rapidly as was desirable in some instances. Further, by means of the present compensator, the operation of the volume changing mechanism is rendered sensitive only to significant changes in the fluid pressure which is to be maintained, but the operation of the volume changing mechanism is stabilized so that it does not "flutter" in response to minor or insignificant pressure changes of small magnitude and very short duration, for example, pump ripple.

The pressure compensator of this invention includes a pilot operated sequence valve having an inlet which is connected into the fluid passage the pressure of fluid in which is to be controlled, and an outlet through which is delivered excess flow, that is, flow in excess of the volume necessary to maintain pressure in the inlet line at the pressure to which the sequence valve has been set. In a preferred embodiment, the sequence valve is of the electrically and fluid pressure operated type which regulates inlet pressure in accordance with the magnitude of an electric signal supplied to it. A bleed-off valve is provided between the outlet of the sequence valve and a tank port to cause at least a very small volume of fluid to flow through the sequence valve whenever the pressure at the inlet is equal to or tends to exceed the pressure at which the sequence valve is set.

The outlet of the sequence valve is connected through a check valve which permits flow from but not toward the outlet, to the inlet area of a pilot operated relief valve, and to two speed control fluid passages, both of which are connected to the fluid pressure operated volume changing mechanism of the translating device.

The relief valve is operated by the pressure of fluid which is applied to a pilot valve structure associated with it, and this pilot valve operating pressure is supplied directly from the outlet of the sequence valve through a restricted orifice. Fluid passing through the relief valve is returned to a fluid reservoir. In a preferred construction, the relief valve is of a very fast acting type in which a main valve is held closed by fluid pressure and in which release of fluid pressure holding the main valve closed is regulated by an adjustable pilot valve. Fluid pressure acting on the pilot valve to hold the main valve of the relief valve closed is drained through the previously mentioned bleed-off valve when the pressure being controlled by the sequence valve falls below the set value, and the relief valve then operates as a check valve to release flow from the volume changing mechanism to tank, whereby the volume of flow through the translating device can be very rapidly increased.

Each of the speed control fluid passages includes an adjustable needle valve and a check valve, and these check valves are oppositely oriented with respect to each other so that the passages permit fluid flow in opposite directions, the rate of fluid flow from the sequence valve toward the volume changing mechanism being controlled by the setting of the needle valve in one of the speed control passages and the rate of flow away from the volume changing mechanism being controlled by the setting of the needle valve in the other speed control passage. A certain small positive pressure is required to open the check valves in the speed control passages, and the volume changing mechanism cannot respond to minor pressure changes which are not great enough to open the check valves.

Figure 1:
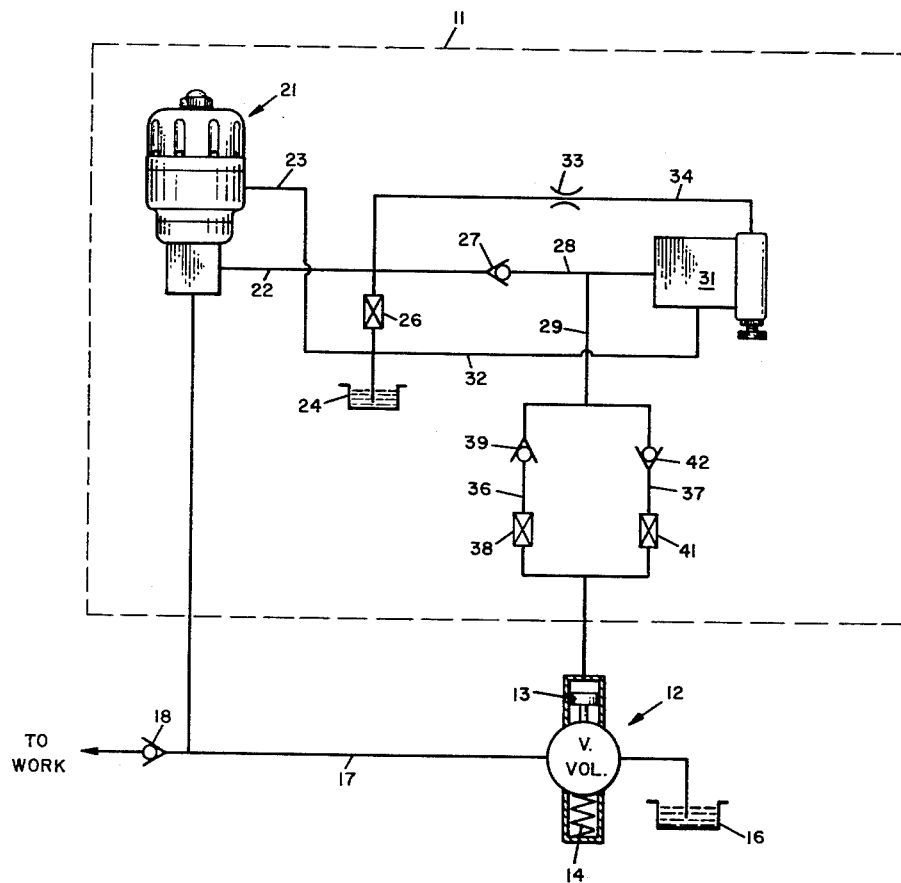
FIGURE 1 is a schematic illustration showing a hydraulic system in which a pressure compensator embodying the features of this invention is incorporated for regulating the volume of fluid flow supplied by a variable volume fluid pump.

The general details of the pressure compensator we have invented can best be seen in FIGURE 1. In FIGURE 1, the compensator is schematically indicated within a dotted line 11, and is used to control the volume of flow passing through a variable volume fluid pressure energy translating device 12, which for purposes of illustration is shown as a variable volume fluid pump.

The pump 12 is characterized in that it includes hydraulic pressure operated mechanism for changing the volume of fluid which it supplies. For purposes of illustration it is assumed that the pump 12 is of the axial piston type and includes a cam plate not shown, the angulation of which in respect to the axis of the pump determines the volume of hydraulic fluid supplied by the pump. The angulation of the cam plate is controlled by the pressure of hydraulic fluid which is applied to a stroking piston 13 which is connected to the cam plate in such manner that when the pressure of the hydraulic fluid applied to the stroking piston 13 is increased, the stroking piston moves the cam plate in a direction causing the volume of fluid supplied the pump 12 to be decreased. A spring 14 opposes the force exerted by the stroking piston 13, and tends to urge the cam plate in a direction increasing the volume of fluid supplied by the pump 12.

The pump 12 receives hydraulic fluid from a tank or reservoir 16, and discharges fluid under pressure to a fluid conduit or pressure line 17. The line 17 includes a check valve 18 and is connected to the pressure inlet of hydraulic apparatus, not shown, which is to be operated by the pump, e.g. a fluid motor.

The compensator which is indicated within the dotted line 11 is connected to the pressure line 17 through a conduit or passage 19, and supplies fluid pressure to operate the stroking piston 13 of the pump 12 to increase or decrease the flow volume being supplied by the pump so that the pump delivers only the volume of fluid which is necessary to maintain a desired pressure in line 17. In other words, the function of the compensator is to regulate the pressure in line 17, and when that pressure increases above a desired magnitude, the compensator actuates the stroking piston to move the cam plate of the pump 12 in such direction that the pump will supply a lesser volume of fluid to line 17, which will tend to reduce the pressure in that line to the desired magnitude. Similarly, when the pressure in line 17 starts to decrease below the desired value, the compensator releases some of the fluid acting on the stroking piston, so that the spring 14 will move the cam plate in a direction increasing the volume of fluid supplied by the pump, thereby restoring the pressure in line 17 to proper value.

Compensator inlet line 19 is connected to the inlet area of a sequence valve which is designated generally by the numeral 21. Sequence valve 21 is adjustable to establish any desired pressure in line 17, for example between 800 and 5000 p.s.i. The valve 21 remains closed until the pressure in line 19, which is applied to its inlet area, reaches the pressure to which it has been set, and then opens to direct fluid from line 19 to a line 22. It should be noted that the valve 21 is a sequence valve, not a relief valve, because the fluid which is discharged to line 22 is used to perform work upon other hydraulic elements, and the back pressure in line 22 must not affect the pressure which the valve 21 maintains in line 17.

Figure 2:
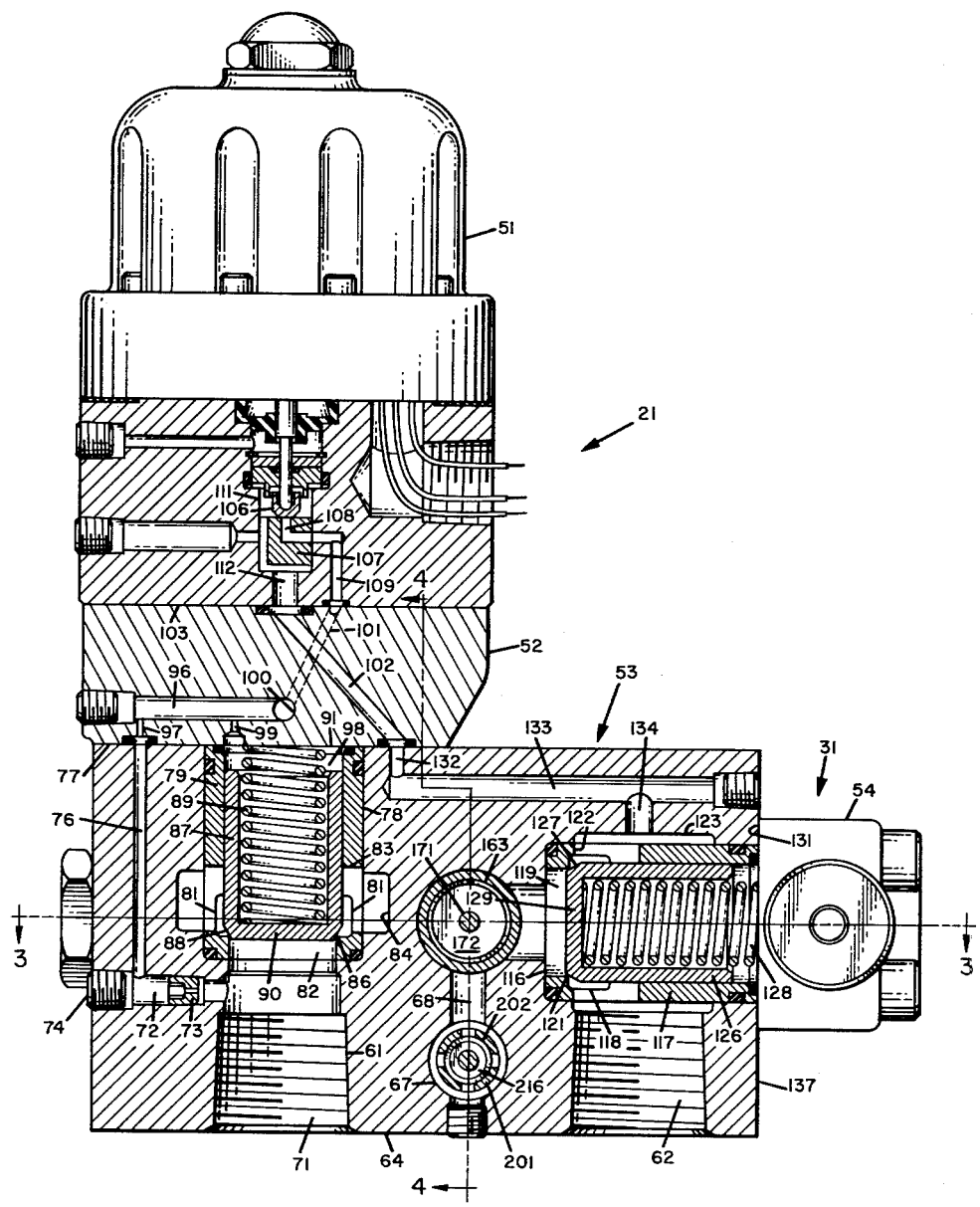
FIGURE 2 is a vertical cross-sectional view through a preferred embodiment of a pressure compensator in accordance with the invention.

Preferably the sequence valve 21 is of the type which is described and claimed in Cecil E. Adams et al. application Serial No. 855,629, filed November 27, 1959, entitled "Electric and Fluid Pressure Operated Valve Mechanism," to which reference is hereby made. The valve shown in the Adams et al. application includes an electromechanical transducer which supplies a substantially constant mechanical force the magnitude of which varies in accordance with the magnitude of an electrical signal supplied to the transducer. The force supplied by the transducer in response to a given electrical input is used to control the pressure in a control chamber, which pressure establishes the pressure at which the sequence valve opens to permit fluid flow from line 19 to line 22. FIGURE 2 of the drawings illustrates in detail a sequence valve which includes features of the invention disclosed and claimed in the Adams et al. application.

Figure 5:
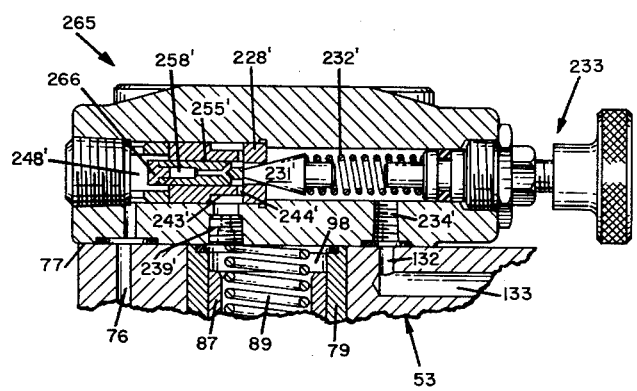
FIGURE 5 is a vertical cross-sectional view through a modified embodiment of a pressure compensator in accordance with the invention, which incorporates a different type of sequence valve than that shown in FIGURE 2.

Although the electrohydraulic sequence valve of the Adams et al. application is preferred as the valve 21, it is contemplated that other types of sequence valves may be used in place of the Adams et al. valve. As another example of a known type of sequence valve which may be used in the pressure compensator of this invention, the sequence valve 21 may be of the type which is shown in Joseph H. Caslow et al. application Serial No. 102,824, filed April 13, 1961, and entitled "High Speed Valve," to which reference is hereby made. FIGURE 5 of the drawings illustrates in detail a sequence valve which includes features of the invention disclosed and claimed in the Caslow et al. application. It is also contemplated that other conventional types of sequence valves may be used as the valve 21.

A drain passage 23 receives drain fluid from sequence valve 21, and is connected to a fluid tank or reservoir 24. In practice, reservoirs 16 and 24 may be one and the same, although they are shown separately in FIGURE 1.

The outlet line 22 of sequence valve 21 is connected to tank 24 through a bleed-off valve 26 which is adjusted to permit a small quantity of fluid to flow to the tank 24. Line 22 is also connected through a check valve 27 which permits flow from, but not to, the sequence valve 21. The outlet side of check valve 27 is connected through a conduit 28 to a branch conduit 29 and also to the inlet area of a pilot operated relief valve 31.

Figure 3:
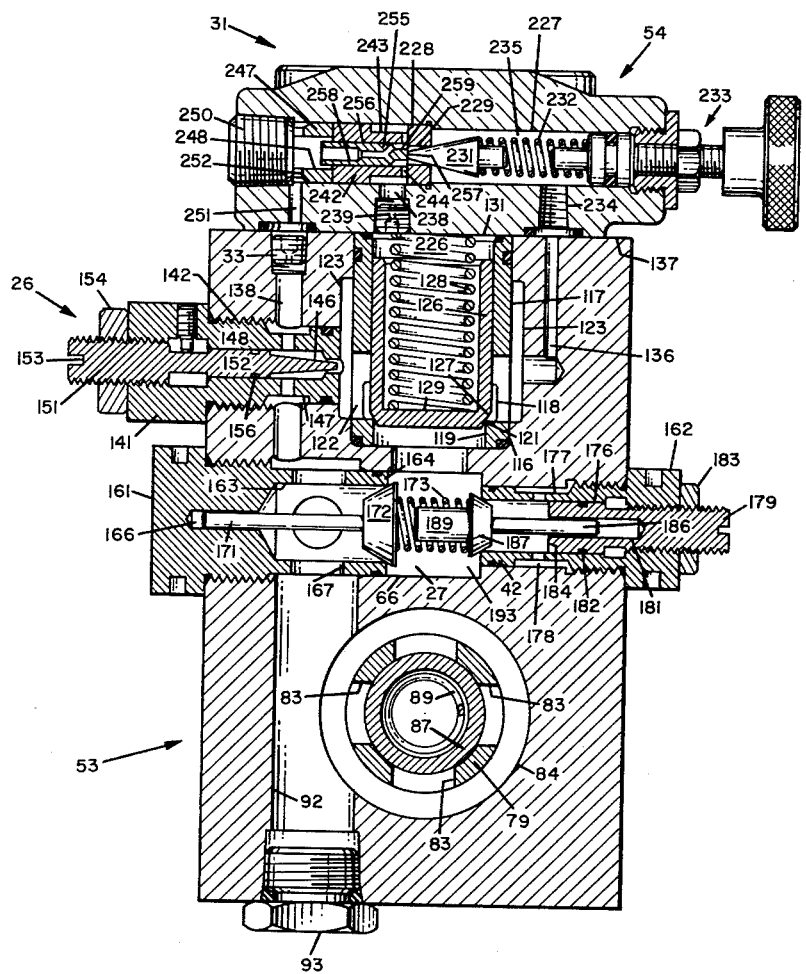
FIGURE 3 is a horizontal cross-sectional view which is taken on line 3—3 of FIGURE 2.

Although it is contemplated that the relief valve 31 may be of any suitable conventional type, it is preferred that the relief valve comprises the valve structure which is described in the previously mentioned Caslow et al. application Serial No. 102,824, because the valve of that application is especially rapid in its action, as will be explained. A relief valve structure 31 in accordance with the Caslow et al. application is illustrated in FIGURE 3 of the drawings and is described in detail hereinafter.

The outlet or discharge port of the relief valve 31 is connected to tank 24 through a passage 32. The pilot valve mechanism which controls the operation of the relief valve 31, the structure of which will be described in more detail subsequently, is connected by a line 34 which includes a restrictor 33 to the sequence valve outlet line 22 ahead of check valve 27.

Branch conduit 29, which is connected to line 28, is connected to the cylinder of the stroking piston 13 of the variable volume pump 12 through a pair of fluid passages 36 and 37. Passage 36 includes a flow restricting or needle valve 38 and a check valve 39 which permits fluid flow from line 29 to the stroking piston 13, and comprises the stroking piston inlet line. Passage 37 includes a flow restricting or needle valve 41 and a check valve 42 which is arranged to permit flow from stroking piston 13 to line 29, and comprises the stroking piston discharge line.

With reference to the pressure controller shown diagrammatically in FIGURE 1, when the pressure of the fluid in line 17 begins to rise above the value at which sequence valve 21 is set to operate, the sequence valve opens sufficiently to maintain the pressure in line 17 at the proper value and directs excess fluid to line 22. Fluid in line 22 flows under pressure past check valve 27 through lines 28 and 29 to the stroking piston inlet line 36. Check valve 42 prevents the fluid from flowing in the stroking piston discharge line 37. Fluid under pressure in line 36 flows to the stroking piston cylinder at a rate which is determined by adjustable needle valve 38, and the force of this fluid acting on the stroking piston 13 moves the cam plate of the pump 12 against spring 14 in a direction decreasing the volume of flow which the pump supplies to line 17, whereby the pump supplies only that volume of fluid necessary to maintain the pressure at which sequence valve 21 is set. In addition, whenever the sequence valve 21 is even slightly open to permit flow to line 22, there will also be a slight drain flow to tank 24 through line 23 and a slight quantity of fluid is constantly bled from line 22 through needle valve 26 to tank 24.

It will be seen that the rate at which fluid is admitted from line 29 to the cylinder of the stroking piston is dependent upon the setting of needle valve 38 and therefore that the rate at which the volume of flow supplied by pump 12 is increased may be fixed as desired by adjusting that valve 38.

If there is a sudden stoppage of fluid flow to the work source, for example if a motor being operated by the pump 12 is suddenly stopped, the pressure of fluid in line 17 will rise very rapdly. Under these conditions the sequence valve 21 may direct almost the entire volume of fluid flowing in line 17 to line 22. But for the presence of needle valve 38 in the stroking piston inlet line 36, this entire volume of fluid would be applied to the stroking piston 13, causing the stroking piston to move very rapidly and possibly even to center, thereby suddenly relieving the pressure in line 17. By reason of the inclusion of needle valve 38 in line 36, however, the rate at which the fluid is admitted to the stroking piston cylinder is regulated so that the stroking piston cannot move too rapidly. Under these conditions the excess fluid flowing in line 28 which does not pass through needle valve 38 to the stroking piston applies pressure against the inlet area of the relief valve 31, which is adjusted to operate at a pressure slightly above the maximum pressure ever required to stroke the stroking piston cylinder, and therefore the relief valve 31 opens and spills this excess fluid to tank 20 through discharge line 32. Thus, the stroking piston 13 is moved at a controlled rate in a direction reducing the volume of fluid supplied by the pump 12, and the volume of fluid supplied by the pump quickly diminishes so that the excess flow passing through line 19 is reduced and so that the pump 12 is not called upon to needlessly supply a large volume of fluid under pressure when the conditions at the work load are such that only a small volume of fluid is required to maintain pressure in line 17.

When the pressure of fluid in line 17 begins to drop below the value to which the sequence valve 21 is set, the sequence valve closes and all of the volume supplied by the pump is directed to work through check valve 18. Under these conditions, the pressure of fluid in lines 22 and 34 is rapidly bled off through valve 26 to tank 24. Fluid under pressure in lines 28, 29 and 37 and in the stroking piston cylinder is trapped by check valve 27 when the relief valve 31 is closed. However, the pressure of the fluid in line 34 which is applied to the pilot valve control mechanism of relief valve 31 controls the operation of the relief valve 31, as will be explained, and when the pressure of the fluid in line 34 drops below the pressure of the fluid in line 28 which is applied to the inlet area of the relief valve 31, the relief valve 31 operates simply as a check valve and discharges excess pressure in line 29 to tank 24 through line 32. Since lines 29 and 37 are now vented to tank through the relief valve, the spring 14 moves the stroking piston upwardly displacing fluid from the stroking piston cylinder through the stroking piston discharge line 37 at a rate which is determined by the setting of the needle valve 41. Movement of the stroking piston upwardly causes the cam plate of the pump 12 to be moved in a direction increasing the volume of the fluid supplied by the pump 12. When the volume of fluid being supplied by the pump 12 is sufficient to maintain the pressure in line 17 at which sequence valve 21 is set to operate, the sequence valve 21 remains barely cracked open, supplying only that volume of fluid to line 22 which is necessary to replace the volume of fluid constantly bled off through valve 26. The pressure of the fluid passing through the sequence valve is applied through line 34 and prevents the relief valve 31 from opening, thereby holding the hanger of the pump in precisely the correct position to maintain the desired pressure.

From the foregoing it will be seen that the speed at which the stroking piston 13 is moved in the volume increasing direction is determined by the setting of needle valve 38 and that the rate at which the stroking piston is moved in the volume decreasing direction is controlled by the setting of needle valve 41. As previously explained, it is desirable to be able to move the stroking piston in the two different directions at different speeds, and the pressure compensator of this invention provides for such independent control. In past constructions, it was impossible for fluid to flow in the volume decrease direction at a greater rate than in the volume increase direction. However, because of the previously described operation of relief valve 31 as a check valve under certain conditions, the relief valve permits the fluid trapped above the stroking piston 13 to be rapidly spilled to tank, while the rate of stroking piston movement in the downward direction in FIGURE 1 may be regulated at a slower rate by adjusting needle valve 38.

An important advantage is derived from the use of the two check valves 39 and 42 in the stroking piston inlet and discharge lines 36 and 37 respectively. Since each check valve 39, 42 requires a definite pressure before it will open to permit flow in the line in which it is included, which roughly will be about 10 p.s.i., the check valves 39 and 42 thereby function to prevent the stroking piston 13 from moving in response to minor pressure fluctuations in line 37 or in line 29. We have found in fact that the double check valves give substantially greater stability of hanger control than is afforded by conventional pressure compensators.

Figure 4:
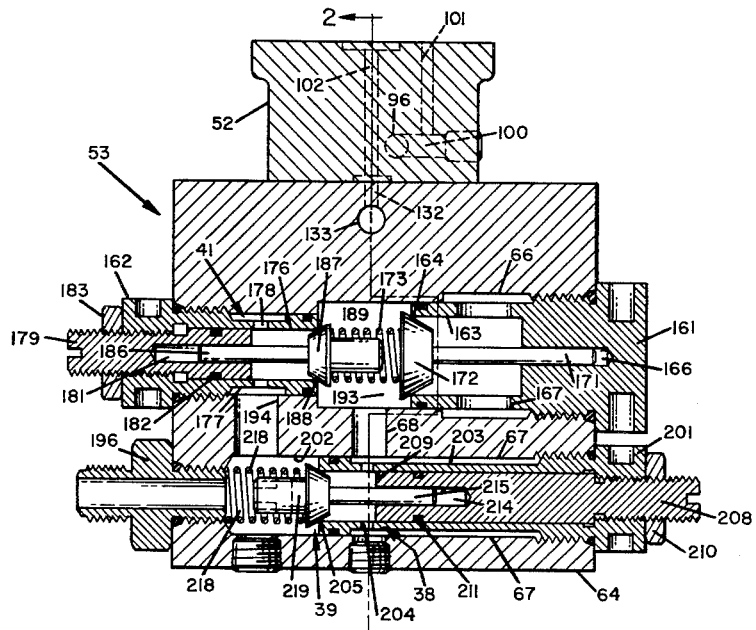
FIGURE 4 is a vertical cross-sectional view which is taken on line 4—4 of FIGURE 2.

FIGURES 2, 3, and 4 of the drawings illustrate a preferred construction of the several elements which are shown diagrammatically within the dotted line 11 in FIGURE 1. The pressure compensator structure which is shown in these figures is in the form of an integral package or assembly, and includes the sequence valve 21 (FIGURE 2), bleed off valve 26 (FIGURE 3), check valve 27 (FIGURES 3 and 4), relief valve 31 FIGURES 2 and 3), check valves 39 and 42, needle valves 38 and 41 (FIGURES 3 and 4), and the connecting fluid passageways. In the figures these elements are designated by the same numerals which they bear in FIGURE 1.

The pressure compensator shown in FIGURES 2–4 comprises four major structural sections as follows: an electrically and fluid pressure operated control valve, which is designated by 51 and which controls the operation of the sequence valve 21, a sandwich section 52, a main body 53, and a relief valve cap structure 54. These component sections 51–54 are connected by screws not shown.

The main body 53 is approximately in the form of a rectangular block. With reference to FIGURE 2, the body 53 has a stepped vertical bore 61 which contains the main valve elements of sequence valve 21. The body 53 also has a vertical bore 62 spaced from bore 61 which extends upwardly from the lower surface 64 of the body. Bore 62 is intersected by a stepped horizontal bore 63, which contains the main valve elements of the relief valve 31. Between bores 61 and 62 are a pair of parallel, vertically spaced bores 66 and 67 which are connected by a vertical bore 68. Horizontal bore 66 intersects bore 63 at right angles (see FIGURES 2 and 3).

The lower end of bore 61 in body 53 comprises a pressure inlet port 71, and is threaded for connection to a fluid conduit corresponding to line 19 of the hydraulic circuit shown in FIGURE 1. A horizontal bore 72 having a restrictor 73 extends laterally from inlet port 71, and is closed at its outer end by a plug 74. A vertical bore 76 extends upwardly from horizontal bore 72 to the upper surface 77 of the body 53.

Above bore 72, vertical bore 61 is enlarged, as at 78, and receives a hollow cylindrical sleeve member 79 which is provided with appropriate fluid seals at its upper and lower end as shown. An annular groove 81 is formed on the inside surface of sleeve 79 adjacent the lower end 82 thereof, which groove communicates through ports 83 through sleeve 79 with an annular groove 84 formed in bore 78. A right angled annular edge 86 is defined by the lower corner of groove 81 of sleeve 79 adjacent lower end 82 thereof, and this edge 86 constitutes one of the surfaces which co-act to form the main valve elements of sequence valve 21.

A hollow right cylindrical cup-shaped poppet or valve member 87 is slidably received inside sleeve 79, and this poppet 87 has a conically tapered peripheral surface 88 adjacent its lower end 90 which cooperates with edge 86 of sleeve 79 to form a valve for controlling the flow of fluid from inlet port 71 to groove 84. Poppet 87 is urged downwardly in sleeve 79 by a spring 89 the upper end of which bears against the lower surface 91 of sandwich section 52. As can best be seen in FIGURE 3, a bore 92 in body 53 communicates between groove 84 and bore 66, and is closed at its outer end by a plug 93.

Sandwich section 52, as is shown in FIGURE 2, is a generally flat, parallel sided section which contains various fluid passageways communicating between the various hydraulic elements of the sequence control valve 51 and body 53. The flat lower surface 91 of sandwich section 52 closes the upper end of bore 78. A horizontal bore 96 in the sandwich section communicates with vertical bore 76 of the body 53 through a connecting bore 97 and with the fluid chamber 98 above poppet 87 by a bore 99. At its outer end bore 96 is plugged, and at its inner end bore 96 meets a transverse horizontal bore 100 which is intersected by a diagonally extending bore 101, which terminates in the upper surface 103 of the sandwich section 52. A second diagonal bore 102 extends from the upper surface 103 of sandwich section 52 to the lower surface 91 thereof. Appropriate fluid seals are provided around the ends of bores 97, 99, 101, and 102, as shown in the drawing.

The structural details of the electrically and fluid operated pilot pressure control valve 51 are fully described in Adams et al. application Serial No. 855,629, to which reference has already been made, and need not be described in full detail herein. Briefly, however, the control valve 51 includes an electro-magnetic transducer which supplies a downwardly acting mechanical force on a control poppet member 106 which force is substantially constant for any given electrical current supplied to the transducer. The poppet member 106 forms a pressure limiting and shut off valve with a valve seat member 107. Diagonally extending passageway 101 in the sandwich section 52 communicates with an axial bore 108 in the seat member 107 by a bore 109, and the chamber 111 in which the poppet member 106 is situated communicates with diagonal bore 102 of sandwich section 52 through a passageway 112. When the force of fluid in bore 108 which tends to move poppet 106 upwardly exceeds the downwardly acting mechanical force on the poppet 106, the valve 106, 108 opens sufficiently to maintain a constant pressure differential across it, the magnitude of which differential is controlled by the magnitude of the electrical current supplied to the control valve 51.

With reference to the main body 53, bore 63 therein has an enlarged portion 116 in which a hollow cylindrical sleeve 117 is received. An annular groove 118 is formed on the interior wall of sleeve 117 adjacent the lower end 119 of the sleeve, a right angled valve edge 121 being defined between groove 118 and the lower end 119 of the sleeve. A plurality of ports 122 extends through sleeve 117 and communicate between groove 118 and a groove 123 formed in bore 116. Groove 123 communicates with vertical bore 62, which comprises a relief valve tank port and which is connectable to a tank corresponding to tank 24 in the system illustrated in FIGURE 1.

A hollow right cylindrical cup-shaped poppet 126 is slidably received in sleeve 117, and has a conically tapered lower peripheral surface 127 which forms a valve with edge 121 of the sleeve 117. Poppet 126 is urged towards edge 121 by a spring 128 which bears upon the lower end 129 of poppet 126 and which at its upper end abuts the under surface 131 of the relief valve cap 54. Sleeve 117 is provided with appropriate fluid seals to bore 116 and to the under surface 131 of the cap structure 54. It is noted that sleeves 79 and 117 may conveniently be similar, as may poppets 87 and 126.

As shown in FIGURE 2, groove 123 in body 53 communicates with diagonally extending bore 102 in sandwich section 52 by interconnecting bores 132, 133, and 134. Bore 133 is plugged at its outer end.

As shown in FIGURE 3, a fluid passageway 136 communicates between groove 123 and the end surface 137 of body 53. Also, a bore 138 which is of lesser diameter than bore 92 communicates between body end surface 137 and bore 92.

Structure forming the bleed off valve 26 is mounted in body 53 between bore 138 and groove 123 (see FIG. 3). Specifically, the bleed off valve 26 includes a stepped cylindrical body portion 141 which is fitted in a bore 142 in body 53. Body portion 141 of bleed off valve 26 has an axial bore 143 which is conically tapered as at 144 at its inner end and which communicates with a smaller diameter outlet bore 146, which communicates in turn with groove 123. A groove 147 is formed around the periphery of body 141 and communicates with bore 138, and a plurality of ports 148 extend through body portion 141 between axial bore 143 thereof and groove 147. Body portion 141 is provided with suitable fluid seals to bore 142 as shown.

An adjustable valve element 151 is threaded into bore 143 of body 141, and at its inner end presents a conically tapered tip 152 of smaller diameter which forms a valve 144, 152 with the edge of bore 146. The valve element 151 is provided with an adjusting slot 153 at its outer end, whereby the opening through valve 144, 152 can be adjusted, and is externally threaded to receive a locking nut 154 by which it is secured axially in bore 143. An O-ring 156 is fitted into a groove in valve element 151 to provide a fluid seal with the wall of bore 143. It will thus be seen that the bleed off valve is adjustable to permit a small flow of fluid from bore 138 to groove 123 and via groove 123 to the tank outlet 62.

Structure which cooperates to form the check valves 27 and 42 and the needle valve 41 is contained in bore 66 of body 53 (see FIGURES 3 and 4). Bore 66 is a stepped bore and at one end is fitted with a plug 161 and at the other end receives a hollow sleeve element 162. At its inner end, plug 161 has an axial bore 163 of large diameter, the inner edge 164 of which cooperates in forming the check valve 27, as will be explained. A smaller diameter bore 166 extends into the plug 161 from the inner end of bore 163. A plurality of ports 167 extend through plug 161 providing fluid communication through the wall of the plug 161 between bore 92, which bore 66 intersects, and bore 163.

A guide shaft 171 having a conically tapered valve element 172 at one end is slidably received in bore 166 of plug 161, and the conically tapered end 172 cooperates with edge 164 of bore 163 to form the check valve 27, which permits flow toward the right in FIGURE 3, but not toward the left. A spring 173 bears against the valve element 172 and urges that element toward edge 164.

Sleeve 162 in bore 66 has a through bore 176 and an annular groove 177 on its outer surface in bore 66. The sleeve is sealed to bore 66 by suitable fluid seals as shown. Several ports 178 communicate between the bore 176 in sleeve 162 and groove 177 thereof. Bore 176 is closed at its outer end by an externally threaded, slotted adjusting plug 179, at the inner end of which a guide bore 181 is drilled. Plug 179 is sealed to bore 176 of sleeve 162 by an O-ring 182, and is locked in axial position relative to sleeve 162 by a lock nut 183. It will be seen that the inner end 184 of the plug 179 cooperates with the ports 178 through sleeve 162 to form a valve the open area of which can be adjusted by changing the axial position of plug 179 relative to the sleeve. Thus the valve which is defined between the surfaces 178, 184 comprises a throttling valve, and this valve corresponds to the needle valve 41 which is shown diagrammatically in FIGURE 1 of the drawings.

A guide shaft 186 is slidably received in bore 181 in plug 179, and this shaft 186 has a conically tapered valve element 187 at its other end which cooperates with the edge 188 of bore 176 of sleeve 162 to form a check valve which corresponds to the check valve 42 of FIGURE 1. This check valve 42 permits flow to the left but not the right in FIGURE 3.

Spring 173 is seated around a cylindrical projection 189 formed on valve element 187, and the right end of the spring 173 bears against valve element 187 to urge that element against the edge 188 of bore 176.

As shown in FIGURE 4, vertical bore 68 in body 53 communicates between the chamber 193 which is closed at its opposite ends by the valve elements 172 and 187, and horizontal bore 67, which is spaced parallel to and below bore 66. A bore 194 which is parallel to bore 68 communicates between groove 177 of sleeve 162 and bore 67, and is closed by a plug at its outer end. With reference to FIGURE 4, a hollow connector 196 is threaded into the left end of bore 67, and this connector 196 is provided with suitable external threads for connection to the stroking piston cylinder of the pump 12. A sleeve 201 having an internal bore 202 is sealingly received in the right end of bore 67. A groove 203 is formed around sleeve 201, and this groove 203 is in fluid communication with the bore 68. A plurality of ports 204 are formed through sleeve 201 which provide fluid communication through the sleeve wall from bore 202 to groove 203. The inner edge 205 of bore 202 of sleeve 201 forms a valve element as will be explained. An externally threaded cylindrical plug 208 is adjustably threaded into sleeve 201, and the inner end 209 of this plug 208 cooperates with the ports 204 to form an adjustable throttling valve the rate of flow of hydraulic fluid through which is determined by the axial position of the plug 208. This valve 204, 209 corresponds to needle valve 38 of the system of FIGURE 1. A locking nut 210 secures the plug 208 axially with respect to the sleeve 201, and an O-ring 211 forms a fluid seal between the plug and sleeve.

A guide bore 214 is drilled axially into the inner end of the plug 208 and a shaft 215 is slidably received in this guide bore 214. Shaft 215 has a conically tapered check valve element 216 affixed to one end which cooperates with the edge 205 of bore 202 to form the check valve which is designated as 39 in FIGURE 1. A spring 218 is seated around a cylindrical projection 219 of valve element 216, and the other end of spring 218 abuts connector 196 so as to urge the valve 205, 216 to closed position.

The details of the relief valve cap structure 54 which is mounted to the end 137 of body block 53, and which closes the chamber 226 above poppet 126, are shown in FIGURE 3. The details of the structure of this cap 54 are disclosed in previously mentioned Caslow et al. application Serial No. 102,824. The cap 54 has a stepped bore 227 against a shoulder in which a fixed valve seat element 228 is held. Valve element 228 has an axial bore 229 which forms a pilot valve with a conically tapered movable valve element 231 which is urged toward the fixed valve element 228 by a spring 232. The compression of spring 232 is adjusted by a threaded adjusting mechanism 233. A bore 234 communicates through the body of the cap 54 between bore 136 in body 53 and chamber 235 in cap bore 227 in which the movable valve element 231 resides. Another bore 238 which includes a restrictor 239 communicates through the cap between the chamber 226 above poppet 126 and bore 227 on the left side of fixed valve element 228.

A hollow cylindrical guide sleeve 242 bears against the left side of fixed element 228, thereby holding that element against the shoulder in the bore. This guide sleeve 242 is provided with a circumferential groove or neck portion 243 adjacent bore 238, and is provided with transverse ports which provide communication between groove 243 and the interior of the sleeve 242. A sleeve 247 having an internal chamber 248 abuts guide sleeve 242, and this sleeve 247 is secured in bore 227 by a plug 250.

The restrictor 33 (see FIGURES 1 and 3) is included in bore 138 of body 53, adjacent the cap 54. A bore 251 provides fluid communication between restrictor 33 and the chamber 248 inside sleeve 247, sleeve 247 having a series of ports 252 formed through it.

A cylindrical pushoff piston 255 is slidably received in the bore 256 of guide sleeve 242 and one end 257 of this piston 255 abuts the end of movable valve element 231. The piston 255 is provided with a restricted bore 258 by which limited fluid communication is established between the chamber 248 at its left end (with reference to FIGURE 3) and its right end. The piston 255 has a neck portion 259 at its right end which is of lesser diameter than the diameter of bore 229 in fixed valve element 228.

The operation of the pressure compensator structure which is illustrated in FIGURES 2–4 may now be described.

The pressure of hydraulic fluid at the inlet port 71 acts on the lower end 90 of poppet 87 of the sequence valve 21, and is also applied in chamber 98 on the upper end of poppet 87, through restrictor 73 and bores 72, 76, 97, 96 and 99. The cross-sectional area of poppet 87 above conical valve surface 88 thereof is slightly larger, preferably about three percent, than the internal area of the lower end 82 of sleeve 79, and therefore, under static conditions when the pilot valve 106, 108 is closed and there is no flow through the restrictor 73, a slightly larger fluid force acts downwardly on the poppet than acts upwardly on it, and the valve 86, 88 is held closed. Spring 89 also supplies a downward force which tends to hold the valve 86, 88 closed.

The pressure of fluid in bore 96 is also applied against the lower end of control poppet element 106 through bores or passages 100, 101, 109, and 108. As long as the upwardly acting fluid force on poppet 106 is less than the downwardly acting mechanical force supplied by the electromechanical transducer of the control valve 51 in response to the electrical current supplied thereto, the valve 106, 108 will be closed, no fluid will flow through the restrictor 73, and the main sequence valve closing pressure in chamber 98 will be maintained. When the fluid pressure at the inlet port 71, which pressure is reflected in pilot bore 108, applies an upwardly acting fluid force greater than the downwardly acting mechanical force on poppet 106, which force remains constant for any given electrical input, the poppet 106 is lifted slightly off seat member 107 until the fluid pressure in bore 108 is exactly balanced by the downwardly acting mechanical force. Under these conditions fluid flows from the inlet port 71 through restrictor 73, bores 76, 96, 101 and 108 through the valve 106, 108 and is discharged to the tank port 62 through bores 112, 102, 132, 133, 134 and groove 123. The flow of fluid through the restricted orifice 73 establishes a pressure differential across the restrictor, and the then relatively lower pressure in bore 76 is reflected in chamber 98 above poppet 87. When the force of fluid pressure at inlet 71 exceeds the downward force of fluid in chamber 98 and the force of spring 89, the poppet 87 is lifted in sleeve 79, opening the main sequence valve 86, 88, and the excess volume of fluid at the inlet 71 flows to groove 81, through ports 83 to outlet groove 84.

The pressure which is maintained at the inlet 71 by the sequence valve 21 is determined by the magnitude of the electrical current which is supplied to the transducer of the pilot or control valve 51, which in turn determines the mechanical force on poppet 106 and the pressure of fluid in bore 108 (and inlet 71) required to lift poppet 106. It will thus be seen that the pressure maintained at the inlet 71 can be changed simply by changing the magnitude of the electrical current which is supplied to the transducer, for example by changing the setting of a variable resistor. It is contemplated that the valve 51 may be set remotely to maintain any desired pressure at inlet 71 and in line 17.

When the pressure at inlet 71 tends to exceed the pressure at which the sequence valve 21 is set to operate, it will be seen that the valve 86, 88 is opened and discharges fluid to groove 84, which corresponds, in effect, to line 22 of FIGURE 1. As will be seen from FIGURE 3, groove 84 is in fluid communication with bore 92, and through bore 92 fluid is applied to the needle valve 26, the restrictor 33 through which fluid pressure is applied to operate the pilot valve in the relief valve cap structure 54, and also to check valve 27. Fluid under pressure in bore 92 is applied against valve element 172 through ports 167 in plug 161, and opens the check valve 164, 172 against the action of spring 173, so that fluid flows into the chamber 193 which is to the right of valve element 172 in FIGURE 3.

After passing through check valve 27, this fluid flows to the stroking piston connection or volume control outlet 196 through bore 68 (see FIGURE 4), through adjustable flow restricting valve 204, 209 and through the check valve 205, 216. By adjusting the axial position of valve element 208 in sleeve 201 the size of the flow opening in valve 204, 209 may be changed so that the rate at which fluid is supplied to the stroking piston 13 to decrease the volume delivered by pump 12 may be set as desired. A definite, positive fluid pressure is required to compress the spring 218 which tends to hold check valve 39 closed, and small pressure differentials which are not great enough to open the check valve 39 will not be reflected in the pressure of fluid applied to the stroking piston 13.

Fluid pressure in bores 92 and 138 is also applied to the left end of the relief pilot valve movable element 231 through groove 147, restrictor 33, bore 251, ports 252, chamber 248, and the restricted bore 258 through push-off piston 255. Until the pressure of this fluid is sufficient to overcome the compression of spring 232, the relief pilot valve 228, 231 remains closed. When the pilot valve 228, 231 is closed, this same pressure is also applied in the chamber 226 which is above poppet 126, through ports 244, groove 243, bore 238, and restrictor 239. Together with the downward force of spring 128, fluid pressure in chamber 226 holds the main relief valve 121, 127 closed against the pressure of fluid in chamber 193 below the lower end 129 of poppet 126.

The bleed-off valve 26 permits a small flow of fluid from bore 138 to tank, through the passage comprising groove 147, ports 148, bore 143, valve 144, 152, bore 146, groove 123 and tank port 62, but this small volume of fluid is supplied by the flow through the sequence valve 21 when that valve is open.

When a large excess volume of fluid passes through the sequence valve 86, 88, and the check valve 164, 172, for example in response to a sudden stoppage of flow to the work source operated by pump 12, the pressure of fluid in chamber 193 rises rapidly. This pressure is also reflected in the fluid force acting on the relief pilot valve element 231 against the force of spring 232. When this force is sufficient to overcome the force of spring 232, the valve 228, 231 is cracked open and fluid flows from chamber 248 through the restricted bore 258 in the push off piston 255, through the valve 228, 231, and is discharged to tank from chamber 235 through bores 234 and 136, groove 123 and port 62. The flow of fluid through the restricted bore 258 in the push off piston 255 establishes a pressure differential between the ends of that piston 255, and an unbalanced endwise force is therefore applied to the push-off piston which urges the piston against the valve element 231, opening the valve 228, 231 very rapidly. Flow through restrictor 33 to the open valve 228, 231 establishes a differential in the pressures on opposite sides of poppet 126. The lesser downwardly acting pressure of fluid in chamber 226 is released through the restrictor 239, bore 238, groove 243, and valve 228, 231, and the main relief valve 121, 127 thereby opens, discharging the excess fluid flow to tank port 62.

The pressure at which the relief valve 31 opens is determined by the pressure required to crack open the relief pilot valve 228, 231, and this pressure is determined by the compression of spring 232, which is fixed by the adjusting mechanism indicated at 233.

Thus, the volume of fluid flow necessary to actuate the stroking piston 13 to reduce the volume of flow through the pump 12 is supplied through the flow reducing valve 38, and flow in excess of that volume is discharged to tank through the relief valve 31. When the volume of fluid flow pressure being delivered by the pump 12 has been reduced so that the pressure at port 71 is equal to the pressure at which the sequence valve 21 is set to operate, the main sequence valve 86, 88 and the sequence pilot valve 106, 108 both nearly close, and only a small flow of fluid passes through the valve 86, 88 to bleed-off valve 26 to tank. The small volume of fluid which passes through the sequence pilot valve 106, 108 is directed to tank through the passageways 112, 102, 133–135 to port 62 (FIGURE 2). The small flow of fluid through the bleed-off valve 26 keeps the sequence valve 21 open, and renders the system responsive to pressure changes at inlet port 71 to reduce or increase the volume of fluid which is supplied by the pump, as will now be explained.

If the pressure at inlet 71 starts to drop below the pressure maintained by the sequence valve 21, the main sequence valve 86, 88, closes. Fluid pressure in bore 138, which pressure is reflected in chamber 226 above the relief valve poppet 126 to hold the main relief valve 121, 127 closed, will under these circumstances be drained through the bleed off valve 144, 152 to tank, thereby releasing the relief valve closing pressure. Specifically, as the pressure in bore 138 is released, the lower pressure is reflected in chamber 226 through restrictor 33, bore 251, chamber 248, and bores 253 and 238. The force of spring 14 (FIGURE 1), which tends to raise the stroking piston 13 in its cylinder, places the fluid in discharge line 37 under pressure and this pressure is reflected to the pressure compensator backwardly through connector 126, bore 194, throttling valve 178, 186, and check valve 187, 188, and is applied through bore 63 against the underside of poppet 126. When the fluid pressure acting to lift the poppet 126 and open the valve 121, 127, exceeds the force of spring 128 and the force of fluid in chamber 226, which as previously explained is being drained through the valve 26, the relief valve will open, and simply acts as a spring controlled check valve. Opening of the relief valve 31 will permit a large flow of fluid in the stroking piston discharge line 37 to tank. The rate of escape of fluid from the stroking piston cylinder is determined by the setting of the valve 41, and may be adjusted to be much greater or less than the rate of flow through the stroking piston inlet speed control valve 38. It will also be seen that the check valve 42 will remain closed in response to minor opening pressures because of the slight pressure required, to operate the spring 173, with the result that the operation of the volume adjusting mechanism is stabilized and responds only to significant pressure changes.

Under stable pressure conditions, that is, when the pressure at inlet 71 is just equal to the pressure the sequence valve is set to maintain, there is a small flow of fluid through the main sequence valve 86, 88 and through the sequence pilot valve 106, 108, as previously explained. The flow of fluid through the valve 86, 88 is just sufficient to replace the volume of fluid constantly bled off through the valve 26, and thereby maintains the pressure of fluid in chamber 226 at a constant value. It will thus be seen that the small flow of fluid to tank through the bled off valve 26 renders the system quickly responsive to sudden pressure decreases, by opening the relief valve 121, 127 so that the volume changing mechanism will rapidly operate to increase the volume of fluid supplied by the pump 12.

The rate at which fluid is supplied to the stroking piston through the stroking piston inlet line 36, to increase the volume of fluid supplied by the pump 12, is adjusted simply by loosening locking nut 210 (FIGURE 4) and changing the axial position of element 208 in bore 202 of sleeve 201. Similarly, the rate at which fluid is released from the stroking piston cylinder to permit the volume supplied by the pump to be increased, can be changed by loosening locking nut 183 and changing the axial position of element 179 in bore 176.

The function of the restrictor 33 in bore 138 between the sequence valve outlet and the relief pilot valve is to establish a pressure differential between the pressures of fluid on opposite ends of poppet 126 when the relief pilot valve 228, 231 is opened, so that the pressure of the fluid in bore 138, which is approximately equal to the pressure fluid in chamber 193, will be greater than the pressure in chamber 226, and will thereby cause the relief valve 121, 127 to open.

The sequence pilot or control valve 51 which governs the operation of the sequence valve 21 permits the actuation pressure of the sequence valve to be electrically controlled, since it is the magnitude of the electrical current to control valve 51 which determines the pressure maintained by the sequence valve in the port 71. For this reason it is preferred that the control valve 51 be similar to the pilot valve which is described in the previously mentioned Adams et al. application. It is contemplated, however, that other pilot operated sequence valves can be used, and FIGURE 5 of the drawings illustrates a manually adjusted pilot valve structure for controlling the operation of the main sequence valve 86, 88. With the exception of the different sequence pilot valve structure 265 which is utilized in place of the structure 51 shown in FIGURE 2, the pressure compensator illustrated in FIGURE 5 is identical to that shown in FIGURES 2 and 4. The sandwich section 52 which is shown in FIGURES 2 and 4 is not necessary in the structure shown in FIGURE 5. The numbers assigned to the various other components of the pressure compensator of FIGURE 5 are the same as those which the corresponding elements bear in the structures of FIGURES 2 through 4.

The sequence pilot valve structure 265 shown in FIGURE 5 is similar to the sequence pilot valve structure which is disclosed in previously mentioned Caslow et al. application Serial No. 102,824. It is also generally similar to the relief pilot valve 54 shown in FIGURE 3, with the exception that the bore 258 through the push-off piston 255 of the relief pilot valve 54 is open, whereas in the sequence pilot valve 265 this bore is closed by a plug 266. In all other respects the two pilot valves 54 and 265 are similar, and in view of this similarity the elements of the sequence pilot valve 265 bear the same number primed which the corresponding elements bear in the relief pilot valve 54.

The operation of the sequence pilot valve illustrated in FIGURE 5 is governed by the manually adjusted compression of the spring 232′ which controls the pressure at which the valve 228′, 231′ opens. An increase in fluid pressure at inlet 71 above the value at which the pilot valve 265 has been set to operate will be reflected in the fluid pressure which acts against the left end of the plug 266 of the push-off piston 255′ and this pressure will push the push-off piston 255′ to the right, thereby cracking open valve 228′, 231′. When valve 228′, 231′ opens, fluid pressure in chamber 98 which holds the valve 86, 88 closed, escapes through restrictor 239′, groove 243′, ports 244′, and valve 228′, 231′ to tank through bores 234′, 132, 133 and 134. Release of pressure at the right end of push-off piston 255′ establishes a pressure differential across the push-off piston 255′, and in response to this the push-off piston pushes the valve 228′, 231′ further open, so that the sequence valve will open rapidly. The compression of spring 232′ maintains the pressure in chamber 98 at a constant value, and when the pressure at the inlet port 71 again becomes equal to this pressure, the force of spring 89 will close the valve 86, 88.

In the operation of the sequence valve shown in FIGURE 5, the main sequence valve 86, 88 is cracked slightly open when the pressure at inlet 71 just equals the pressure at which the sequence valve is set to operate, so that there is a small flow of fluid through the sequence valve to supply that volume which is constantly bled off through the valve 26.

While we have described the preferred embodiment of our invention, it will be understood that the invention is not limited to that embodiment alone but includes other modifications and variations coming within the scope and spirit of the claims which follow.

Having described my invention, I claim:

1. A pressure compensator comprising, a sequence valve having an inlet and an outlet, a relief valve of the type having a pilot valve for controlling the operation of said relief valve in response to pressure applied to said pilot valve, said relief valve having an inlet and an outlet, a fluid passage between the outlet of said sequence valve and the inlet of said relief valve, said passage including a check valve preventing flow in said passage toward the outlet of said sequence valve, a drain line including bleed-off means connected to the outlet of said sequence valve, a fluid conduit between the outlet of said sequence valve and said pilot valve, fluid conduit interconnecting means, a first fluid passage including throttling means and a check valve between said interconnecting means and the inlet of said relief valve, said check valve in said first passage preventing flow toward said interconnecting means, and a second passage including throttling means and a check valve between said interconnecting means and the inlet of said relief valve, said check valve in said second passage preventing flow toward the inlet of said relief valve.

2. A pressure compensator comprising, a sequence valve having an inlet and an outlet, a relief valve of the type having a pilot valve for controlling the operation of said relief valve in response to pressure applied to said pilot valve, said relief valve having an inlet and an outlet, a fluid passage between the outlet of said sequence valve and the inlet of said relief valve, said passage including a check valve preventing flow in said passage toward the outlet of said sequence valve, a drain line including bleed-off means connected to the outlet of said sequence valve, a fluid conduit including a restrictor between the outlet of said sequence valve and said pilot valve, fluid conduit interconnecting means, a first fluid passage including a throttling means and a check valve between said interconnecting means and the inlet of said relief valve, said check valve in said first passage preventing flow toward said interconnecting means, and a second passage including a throttling means and a check valve between said interconnecting means and the inlet of said relief valve, said check valve in said second passage preventing flow toward the inlet of said relief valve.

3. A pressure compensator comprising, a sequence valve having an inlet and an outlet, a relief valve of the type having a pilot valve for controlling the operation of said relief valve in response to pressure applied to said pilot valve, said relief valve having an inlet and an outlet, a fluid passage between the outlet of said sequence valve and the inlet of said relief valve, said passage including a check valve preventing flow in said passage toward the outlet of said sequence valve, a drain line including adjustable bleed-off means connected to the outlet of said sequence valve, a fluid conduit including a restrictor between the outlet of said sequence valve and said pilot valve, fluid conduit interconnecting means, a first fluid passage including throttling means and a check valve between said interconnecting means and the inlet of said relief valve, said check valve in said first passage preventing flow toward said interconnecting means, and a second passage including throttling means and a check valve between said interconnecting means and the inlet of said relief valve, said check valve in said second passage preventing flow toward the inlet of said relief valve.

4. A pressure compensator comprising, a sequence valve having an inlet and an outlet, a relief valve of the type having a pilot valve for controlling the operation of said relief valve in response to pressure applied to said pilot valve, said relief valve having an inlet and an outlet, a fluid passage between the outlet of said sequence valve and the inlet of said relief valve, said passage including a check valve preventing flow in said passage toward the outlet of said sequence valve, a drain line including adjustable bleed-off means connected to the outlet of said sequence valve, a fluid conduit including a restrictor between the outlet of said sequence valve and said pilot valve, fluid conduit interconnecting means, a first fluid passage including adjustable flow throttling means and a check valve between said interconnecting means and the inlet of said relief valve, said check valve in said first passage preventing flow toward said interconnecting means, and a second passage including adjustable flow throttling means and a check valve between said interconnecting means and the inlet of said relief valve, said check valve in said second passage preventing flow toward the inlet of said relief valve.

5. A pressure compensator comprising, a sequence valve having an inlet and an outlet, a relief valve of the type having a pilot valve for controlling the operation of said relief valve in response to pressure applied to said pilot valve, said relief valve having an inlet and an outlet, a fluid passage between the outlet of said sequence valve and the inlet of said relief valve and including a check valve preventing flow toward the outlet of said sequence valve, adjustable bleed-off means connected to the outlet of said sequence valve, means for connecting said bleed-off means and the outlet of said relief valve to a fluid reservoir, a flow restricting fluid passageway between the outlet of said sequence valve and said pilot valve for applying pressure to said pilot valve, a volume control connection, a first fluid passage including an adjustable throttling valve and a check valve between said volume control connection and the inlet of said relief valve, said check valve in said first passage preventing flow toward said volume control connection, and a second fluid passage including an adjustable throttling valve and a check valve between said volume control connection and the inlet of said relief valve, said check valve in said second passage preventing flow toward the inlet of said relief valve.

6. A pressure compensator comprising, a sequence valve of the type having a pilot valve for controlling the operation of said sequence valve in response to pressure applied to said pilot valve, said sequence valve having an inlet, a pressure outlet and a pilot flow outlet, a relief valve of the type having a pilot valve for controlling the operation of said relief valve in response to pressure applied to the pilot valve of said relief valve, said relief valve having an inlet and an outlet, a fluid passage between the pressure outlet of said sequence valve and the inlet of said relief valve and including a check valve preventing flow in said passage toward the pressure outlet of said sequence valve, a drain line including adjustable bleed-off means connected to the pressure outlet of said sequence valve, a fluid conduit between the pressure outlet of said sequence valve and the pilot valve of said relief valve, a pressure connection, parallel first and second fluid passages between said pressure connection and the inlet of said relief valve, each of said first and second passages including a check valve and an adjustable flow restricting valve, the check valve in said first passage preventing flow toward said pressure connection, the check valve in said second passage preventing flow toward the inlet of said relief valve.

7. A pressure compensator comprising, a sequence valve of the type having a pilot valve for controlling the operation of said sequence valve in response to pressure applied to said pilot valve, said sequence valve having an inlet, a pressure outlet and a pilot flow outlet, a relief valve of the type having a pilot valve for controlling the operation of said relief valve in response to pressure applied to the pilot valve of said relief valve, said relief valve having an inlet and an outlet, a fluid passage between the pressure outlet of said sequence valve and the inlet of said relief valve including a check valve preventing flow in said passage toward the pressure outlet of said sequence valve, a drain line including adjustable bleed-off means connected to the pressure outlet of said sequence valve, a flow restricting fluid conduit between the pressure outlet of said sequence valve and the pilot valve of said relief valve for supplying control pressure to the pilot valve of said relief valve when said sequence valve is open, a pressure connection, parallel first and second fluid passages between said pressure connection and the inlet of said relief valve, each of said first and second passages including a check valve and an adjustable flow restricting means, the check valve in said first passage preventing flow toward said pressure connection, the check valve in said second passage preventing flow toward the inlet of said relief valve.

8. A pressure compensator for controlling the volume of fluid through a fluid pressure energy translating device having hydraulic pressure operated volume changing mechanism, said compensator comprising, an adjustable sequence valve of the type having a pilot valve for controlling the operation of said sequence valve in response to pressure applied to said pilot valve, said sequence valve having an inlet, a pressure outlet and a pilot flow outlet, a relief valve of the type having a pilot valve for controlling the operation of said relief valve in response to pressure applied to the pilot valve of said relief valve, said relief valve having an inlet and an outlet, a fluid passage between the pressure outlet of said sequence valve and the inlet of said relief valve and including a check valve preventing flow in said passage toward the pressure outlet of said sequence valve, a drain line including adjustable bleed-off means connected to the pressure outlet of said sequence valve, a fluid conduit between the pressure outlet of said sequence valve and the pilot valve of said relief valve, a pressure connection connectable to the volume changing mechanism of said energy translating device, parallel first and second fluid passages between said pressure connection and the inlet of said relief valve, each of said first and second passages including a check valve and an adjustable flow throttling valve, the check valve in said first passage preventing flow toward said pressure connection, the check valve in said second passage preventing flow toward the inlet of said relief valve.

9. A pressure compensator comprising, a sequence valve of the type having an electromechanical transducer operated pilot valve for controlling the operation of said sequence valve in accordance with the magnitude of an electric signal applied to said transducer, said sequence valve having an inlet, a pressure outlet and a pilot flow outlet, a relief valve of the type having a pilot valve for controlling the operation of said relief valve in response to pressure applied to the pilot valve of said relief valve, said relief valve having an inlet and an outlet, a fluid passage between the pressure outlet of said sequence valve and the inlet of said relief valve and including a check valve preventing flow in said passage toward the pressure outlet of said sequence valve, a drain line including adjustable bleed-off means connected to the pressure outlet of said sequence valve, a fluid conduit between the pressure outlet of said sequence valve and the pilot valve of said relief valve, a pressure connection, parallel first and second fluid passages between said pressure connection and the inlet of said relief valve, each of said first and second passages including a check valve and an adjustable flow throttling valve, the check valve in said first passage preventing flow toward said pressure connection, the check valve in said second passage preventing flow toward the inlet of said relief valve.

10. A pressure compensator comprising, an electrically and fluid pressure operated sequence valve of the type which controls fluid pressure in accordance with the magnitude of an electrical signal applied thereto, said sequence valve having an inlet and an outlet, a relief valve of the type having a pilot valve for controlling the operation of said relief valve in response to pressure applied to the pilot valve of said relief valve, said relief valve having an inlet and an outlet, fluid passage means including a restrictor for applying the pressure at the outlet of said sequence valve to the pilot valve of said relief valve, a drain line including an adjustable bleed-off valve connected to said passage means to bleed off fluid therein, a fluid passage between the pressure outlet of said sequence valve and the inlet of said relief valve and including a check valve preventing flow toward said pressure outlet, a pressure connection, parallel first and second fluid passages between said pressure connection and the inlet of said relief valve, each of said first and second passages including a check valve and an adjustable flow throttling valve, the check valve in said first passage preventing flow toward said pressure connection, the check valve in said second passage preventing flow toward the inlet of said relief valve.

11. A pressure compensator comprising, an electrically and fluid pressure operated sequence valve of the type which controls fluid pressure in accordance with the magnitude of an electrical signal supplied to a pilot valve in said sequence valve, said sequence valve having an inlet, a pressure outlet and a pilot flow outlet, a relief valve of the type having a pilot valve for controlling the operation of said relief valve in response to pressure applied to the pilot of said relief valve, said relief valve having an inlet and an outlet, a fluid passage between the pressure outlet of said sequence valve and the inlet of said relief valve and including a check valve preventing flow in said passage toward the pressure outlet of said sequence valve, a drain line including an adjustable bleed-off means connected to the pressure outlet of said sequence valve, a fluid conduit for reflecting the pressure at the outlet of said sequence valve at the pilot valve of said relief valve, a pressure connection, parallel first and second fluid passages between said pressure connection and the inlet of said relief valve, each of said first and second passages including a check valve and an adjustable flow throttling valve, the check valve in said first passage preventing flow toward said pressure connection, the check valve in said second passage preventing flow toward the inlet of said relief valve.

12. A pressure compensator comprising, an electrically and fluid pressure operated sequence valve of the type which controls fluid pressure in accordance with the magnitude of an electrical signal supplied to a pilot valve in said sequence valve, said sequence valve having an inlet, a pressure outlet and a pilot flow outlet, a relief valve of the type having a pilot valve for controlling the operation of said relief valve in response to pressure applied to the pilot valve of said relief valve, said relief valve having an inlet and an outlet, a fluid passage between the pressure outlet of said sequence valve and the inlet of said relief valve and including a check valve preventing flow in said passage toward the pressure outlet of said sequence valve, a drain line including an adjustable bleed-off means connected to the pressure outlet of said sequence valve, a fluid conduit for reflecting the pressure at the outlet of said sequence valve at the pilot valve of said relief valve, a tank outlet, conduits connecting the pilot flow outlet of said sequence valve, the outlet of said relief valve and said drain line to said tank outlet, a pressure connection, parallel first and second fluid passages between said pressure connection and the inlet of said relief valve, each of said first and second passages including a check valve and an adjustable flow throttling valve, the check valve in said first passage preventing flow toward said pressure connection, the check valve in said second passage preventing flow toward the inlet of said relief valve.

13. A pressure compensator comprising, a sequence pressure control valve of the type having a pilot valve for controlling the operation of said sequence valve in response to pressure applied to said pilot valve, said sequence valve having an inlet, a pressure outlet and a pilot flow outlet, a relief valve having an inlet, an outlet, a movable poppet valve member for controlling flow between its inlet and outlet and a pilot valve for controlling the operation of said movable poppet valve member in response to pressure applied to the pilot valve of said relief valve, a fluid passage between the pressure outlet of said sequence valve and the inlet of said relief valve and including a check valve preventing flow in said passage toward the pressure outlet of said sequence valve, a fluid passage including a flow restrictor between the pressure outlet of said sequence valve and the pilot valve of said relief valve, an adjustable bleed-off means for bleeding off fluid in the passage which includes said restrictor, a volume control fluid line, first and second fluid passages between said volume control line and the inlet of said relief valve, each of said first and second passages including a check valve and an adjustable flow throttling valve, the check valve in said first passage preventing flow toward said volume control line, the check valve in said second passage preventing flow toward the inlet of said relief valve.

14. A pressure compensator comprising, a sequence valve having an inlet and an outlet, a relief valve of the type having a pilot valve for controlling the operation of said relief valve in response to pressure applied to said pilot valve, said relief valve having an inlet and an outlet, a fluid passage between the outlet of said sequence valve and the inlet of said relief valve and including a check valve preventing flow in said passage toward the outlet of said sequence valve, a line supplying pressure delivered through said sequence valve to operate said pilot valve, said line including an adjustable bleed-off means, a pressure connection, parallel first and second fluid passages between said pressure connection and the inlet of said relief valve, each of said first and second passages including a check valve and an adjustable flow throttling means, the check valve in said first passage preventing flow toward said pressure connection, the check valve in said second passage preventing flow toward the inlet of said relief valve.

15. A pressure compensator comprising, a sequence valve, said sequence valve having an inlet and an outlet, a relief valve having an inlet and an outlet, a fluid passage between the outlet of said sequence valve and the inlet of said relief valve and including a check valve preventing flow in said passage toward the outlet of said sequence valve, a pressure connection, parallel first and second fluid passages between said pressure connection and the inlet of said relief valve, each of said first and second passages including a check valve and an adjustable flow throttling valve, the check valve in said first passage preventing flow toward said pressure connection, the check valve in said second passage preventing flow toward the inlet of said relief valve, and means opening said relief valve in response to fluid pressure in said second passage when said sequence valve is closed.

16. A pressure compensator comprising, a sequence valve having an inlet and an outlet, a relief valve of the type having a pilot valve for controlling the operation of said relief valve in response to operating pressure supplied to the pilot valve, said relief valve having an inlet and an outlet, a fluid passage between the outlet of said sequence valve and the inlet of said relief valve and including a check valve preventing flow in said passage toward the outlet of said sequence valve, a pressure connection, first and second fluid passages between said pressure connection and the inlet of said relief valve, each of said first and second passages including a check valve and an adjustable flow throttling means, the check valve in said first passage preventing flow toward said pressure connection, the check valve in said second passage preventing flow toward the inlet of said relief valve, means supplying operating pressure to said pilot valve when said sequence valve is open, and means bleeding-off said operating pressure when said sequence valve is closed.

No references cited.